United States Patent
Watanabe et al.

(10) Patent No.: US 8,073,011 B2
(45) Date of Patent: Dec. 6, 2011

(54) PSEUDO BASE STATION APPARATUS

(75) Inventors: Toshiyuki Watanabe, Atsugi (JP); Keiji Kameda, Atsugi (JP); Nobumitsu Umezawa, Atsugi (JP); Olivier Genound, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 141 days.

(21) Appl. No.: 12/723,904

(22) Filed: Mar. 15, 2010

(65) Prior Publication Data

US 2010/0240360 A1   Sep. 23, 2010

(30) Foreign Application Priority Data

Mar. 17, 2009 (JP) ................................ 2009-063865

(51) Int. Cl.
*H04J 3/24* (2006.01)
(52) U.S. Cl. ........ 370/473; 370/282; 370/390; 455/425; 455/445; 455/435.2
(58) Field of Classification Search .................. 370/473, 370/282, 390; 455/425, 445, 435.2
See application file for complete search history.

(56) References Cited

U.S. PATENT DOCUMENTS

2008/0232403 A1 * 9/2008 Tsai et al. ...................... 370/473
2008/0285738 A1 * 11/2008 Misra et al. ............... 379/265.09

FOREIGN PATENT DOCUMENTS

JP   2006-174173   6/2006
JP   2008-277914   11/2008

* cited by examiner

*Primary Examiner* — Phuoc Doan
(74) *Attorney, Agent, or Firm* — Greer, Burns & Crain, Ltd.

(57) ABSTRACT

Provided is a pseudo base station apparatus which allow a user to certainly acquire log data at a desired timing. A set-up unit 41 sets filter conditions and acquisition conditions. A first log acquisition unit 32A includes a first buffer 32Aa, which stores log data and updates the stored content when the buffer capacity is full, and acquires a first log data that a user wants. A second log acquisition unit 32B includes a detector 32Ba, which detects log data that coincides with the log acquisition conditions among the log data, and a second buffer 32Bb, which stores the log data detected by the detector 32Ba and constantly updates the stored content within the range of the buffer capacity, and acquires a second log data that a user wants. The apparatus acquires the first log data by the first log acquisition unit 32A and, when the log data that coincides with the log acquisition conditions is generated, acquires the second log data by the second log acquisition unit 32B, and transmits the log data to be displayed on a display 43.

6 Claims, 6 Drawing Sheets

PSEUDO BASE STATION APPARATUS

CROSS-REFERENCE TO RELATED APPLICATION

This application claims priority to and the benefit of Japanese Patent Application No. 2009-63865, filed on Mar. 17, 2009, the disclosure of which is incorporated herein by reference in its entirety.

BACKGROUND

1. Field of the Invention

The present invention relates to a pseudo base station apparatus, which transmits and receives a variety of communication information to and from a terminal to be tested such as a mobile terminal (e.g., cellular phone) according to a scenario based on the test content and displays log data based on the transmission and reception as trace information in order to test whether the terminal to be tested normally operates, and more particularly, to a pseudo base station apparatus, which can certainly acquire log data at a user's desired timing during transmission and reception of a variety of communication information to and from a terminal to be tested.

2. Discussion of Related Art

In the case where a mobile terminal such as a cellular phone is newly developed, it is necessary to test whether the newly development mobile terminal normally operates in an environment where the mobile terminal is actually used. However, it is extremely difficult to test whether the newly developed mobile terminal normally operates by transmitting and receiving a variety of test communication information.

Therefore, as disclosed in Japanese Patent Publication Nos. 2006-174173 and 2008-277914, for example, a pseudo base station apparatus performs a test to determine whether a newly developed mobile terminal normally operates by connecting the newly developed mobile terminal to the pseudo base station apparatus having the same function as an actual base station and transmitting and receiving a variety of communication information between the mobile terminal and the pseudo base station apparatus.

In more detail, the pseudo base station apparatus is wired or wirelessly connected to the mobile terminal to transmit a variety of test signals to the mobile terminal (in a downlink direction). The mobile terminal performs a predetermined process according to a scenario written in advance based on the test content on a test signal transmitted from the pseudo base station apparatus. And, the pseudo base station apparatus determines whether a response signal transmitted from the mobile terminal with respect to the test signal (in an uplink direction) is a normal signal.

Figure 5:
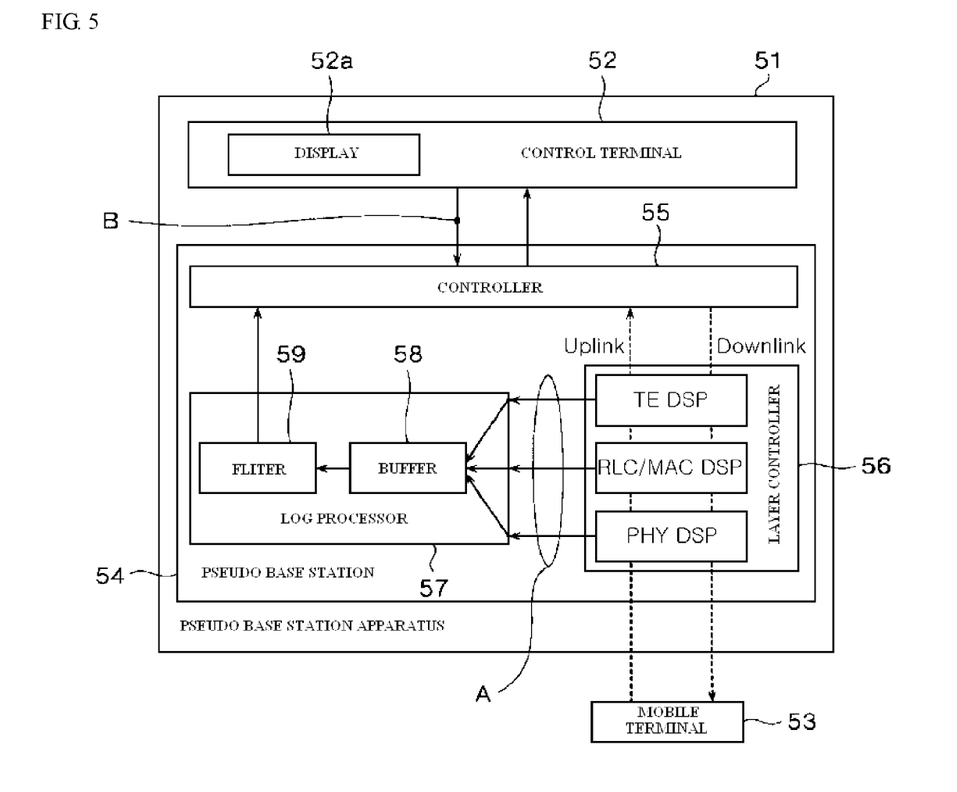
FIG. 5 is a block diagram showing a schematic configuration of a conventional pseudo base station apparatus.
Figure 6:
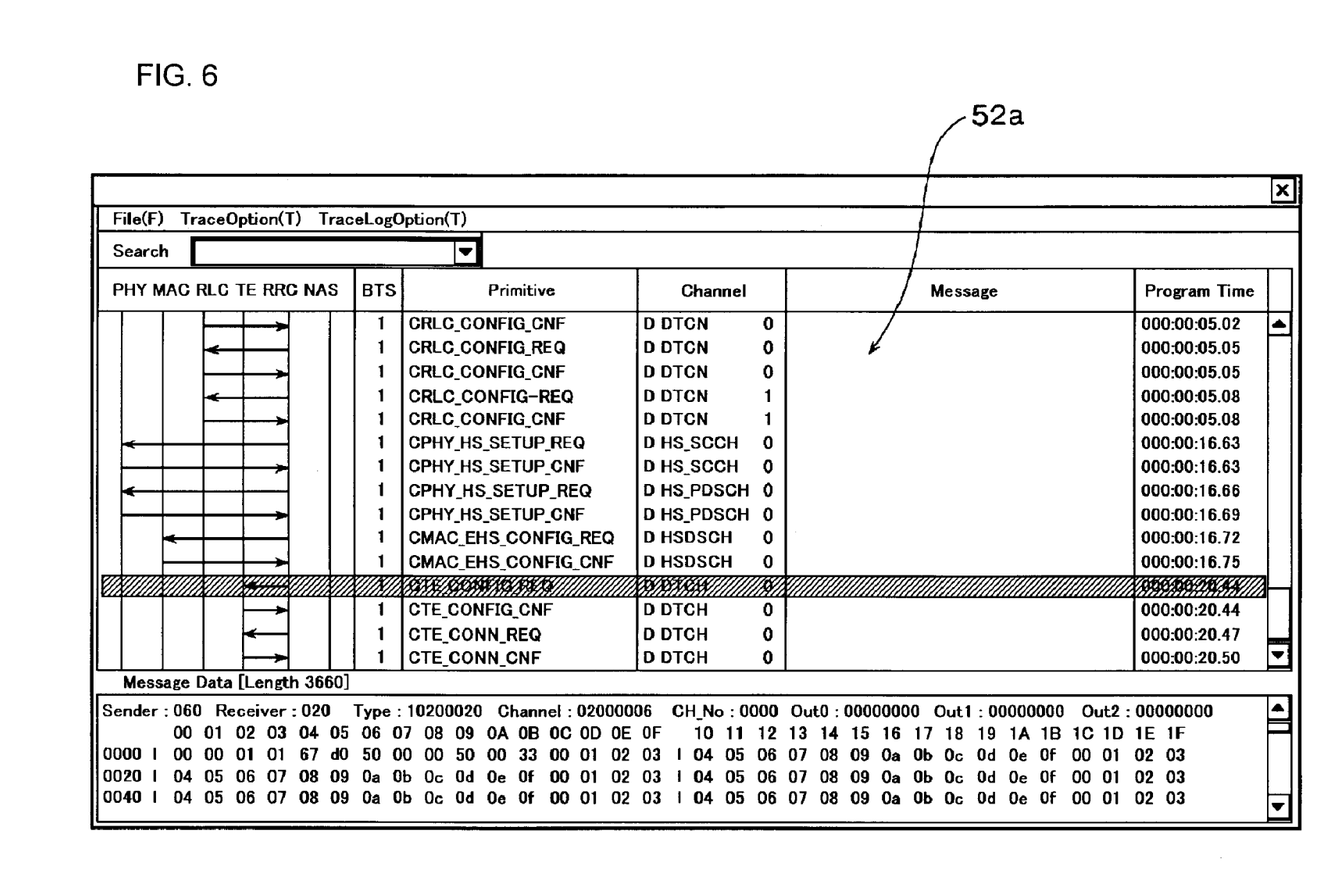
FIG. 6 is a diagram showing an example of log data displayed by a conventional pseudo base station apparatus.

FIG. 5 shows a schematic configuration of a conventional pseudo base station apparatus. As shown in FIG. 5, the pseudo base station apparatus 51 broadly comprises a control terminal 52, which includes an external terminal device, and a pseudo base station 54, which performs a data communication with a mobile terminal 53 as a terminal to be tested in response to a command from the control terminal 52. The pseudo base station 54 includes a controller 55, a layer processor 56 at each layer, and a log processor 57. The log processor 57 includes a buffer 58 and a filter 59. In the pseudo base station apparatus 51, when a command according to a scenario written in advance based on the test content is output from the control terminal 52 to the pseudo base station 54, a predetermined data communication between the pseudo base station 54 and the mobile terminal 53 is performed under the control of the controller 55 such that U-Plane/C-Plane data (log data) from the layer processor 56 of layers (PHY/RLC/MAC/TE DSP) according to the data communication is input to the log process (LOG DSP) 57 and then transmitted to the control terminal 52. Therefore, log data as shown in FIG. 6, for example, is displayed on a display 52a of the control terminal 52 such that a user can identify a series of operations of the mobile terminal 53 from the log data displayed on the display 52 of the control terminal 52.

However, in the conventional pseudo base station apparatus 51 as shown in FIG. 5, the data rate of point A is often higher than that of point B. In detail, while the data rate of point A is about 160 Mbps, the data rate of point B is about 10 Mbps. That is, the data rate of point A is more than 10 times that of point B. For this reason, it is impossible to transmit the log data to the control terminal 52 in real time, and thus the log data is omitted. As a result, it is difficult for the user to acquire the log data at a desired timing.

Moreover, due to the omission of the log data, the user cannot identify the operation of the mobile terminal 53 by directly analyzing the log data, and thus the development efficiency of the mobile terminal 53 is significantly reduced.

SUMMARY OF THE INVENTION

The present invention has been made in an effort to solve the above-described problems associated with the prior art, and an object of the present invention is to provide a pseudo base station apparatus which allows a user to certainly acquire log data at a desired timing.

According to an aspect of the present invention, there is provided a pseudo base station apparatus, which transmits and receives a variety of communication information to and from a mobile terminal to be tested according to a predetermined scenario and sends desired log data based on the transmission and reception to a display, the apparatus comprising: a set-up unit for setting log acquisition conditions; a first log acquisition unit including a first buffer, which stores log data and updates the stored log data when the buffer capacity is full, and acquiring a desired first log data; and a second log acquisition unit including a detector, which detects log data that coincides with the log acquisition conditions among the log data, and a second buffer, which stores the detected log data whenever the detector detects the log data and updates the stored content within the range of the buffer capacity, and acquiring a desired second log data; wherein the apparatus acquires the first log data by the first log acquisition unit and, when the log data that coincides with the log acquisition conditions is generated, sends the second log data acquired by the second log acquisition unit data to the display.

The apparatus may comprise two filters, each of the filters being connected to the first and second buffers respectively, wherein the set-up unit may set filter conditions for the two filters to pass the log data in addition to the log acquisition conditions.

The apparatus may comprise at least one filter, the filter being connected to a front of at least one of the first and second buffers, wherein the set-up unit set filter conditions for the filter to pass the log data in addition to the log acquisition condition.

According to another aspect of the present invention, there is provided a test method for mobile terminals, in which a variety of communication information is transmitted and received to and from a mobile terminal to be tested according to a predetermined scenario, and desired log data is sent based on the transmission and reception to a display, the method comprising: a setting-up step for setting log acquisition conditions; a first log data storing step for storing said log data on a first buffer as a first log data; a first log data outputting step for outputting the first log data stored on the first buffer completely when the first buffer capacity is full, and emptying the first buffer; a first updating step for repeating said first log data storing step and the first log data outputting step; a second updating step for updating said log data constantly and storing the log data on a second buffer; a detecting step for detecting log data that coincides with a log acquisition condition among the log data; a second log data displaying step for storing the first log data at the first log data storing step, and, when a log data that coincides with the log acquisition conditions is detected at the detecting step, and outputting the log data stored on the second buffer as a second log data to be displayed.

The setting-up step is for setting filter conditions for passing the log data in addition to said log acquisition conditions, and further comprising: a first filtering step for passing a log data that satisfies said filter conditions among the first log data outputted from the first buffer, and a second filtering step for passing a log data that satisfies said filter conditions among the second log data outputted from the second buffer.

The setting-up step is for setting filter conditions for passing the log data in addition to said log acquisition conditions, and further comprising least one of; a first filtering step for passing a log data that satisfies said filter conditions among the log data and outputting the log data to said first buffer, or a second filtering step for passing a log data that satisfies said filter conditions among the log data and outputting the log data to said second buffer.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings such that those skilled in the art to which the present invention pertains can easily practice the present invention.

Figure 1:
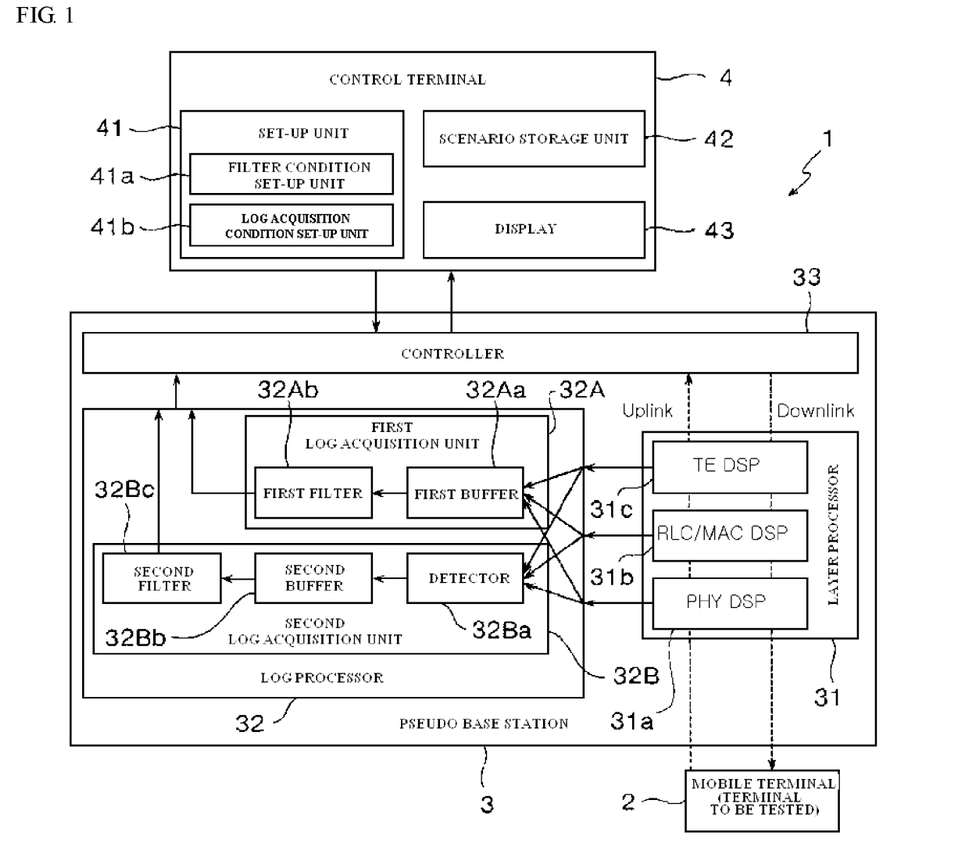
FIG. 1 is a block diagram showing a schematic configuration of a pseudo base station apparatus in accordance with an exemplary embodiment of the present invention.
Figure 2:
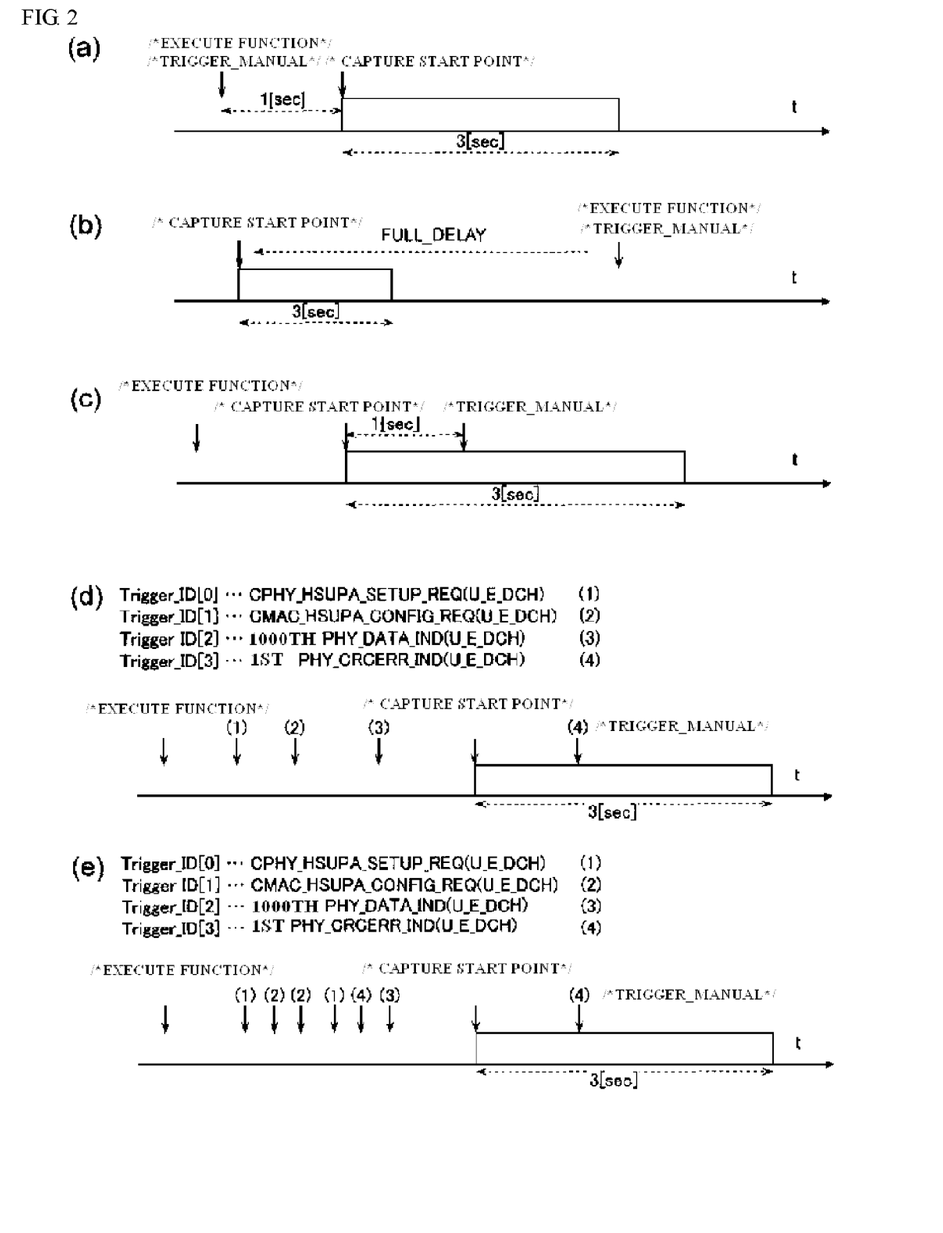
FIGS. 2A to 2E are diagrams showing examples of a process of acquiring log data based on log data acquisition conditions.
Figure 3:
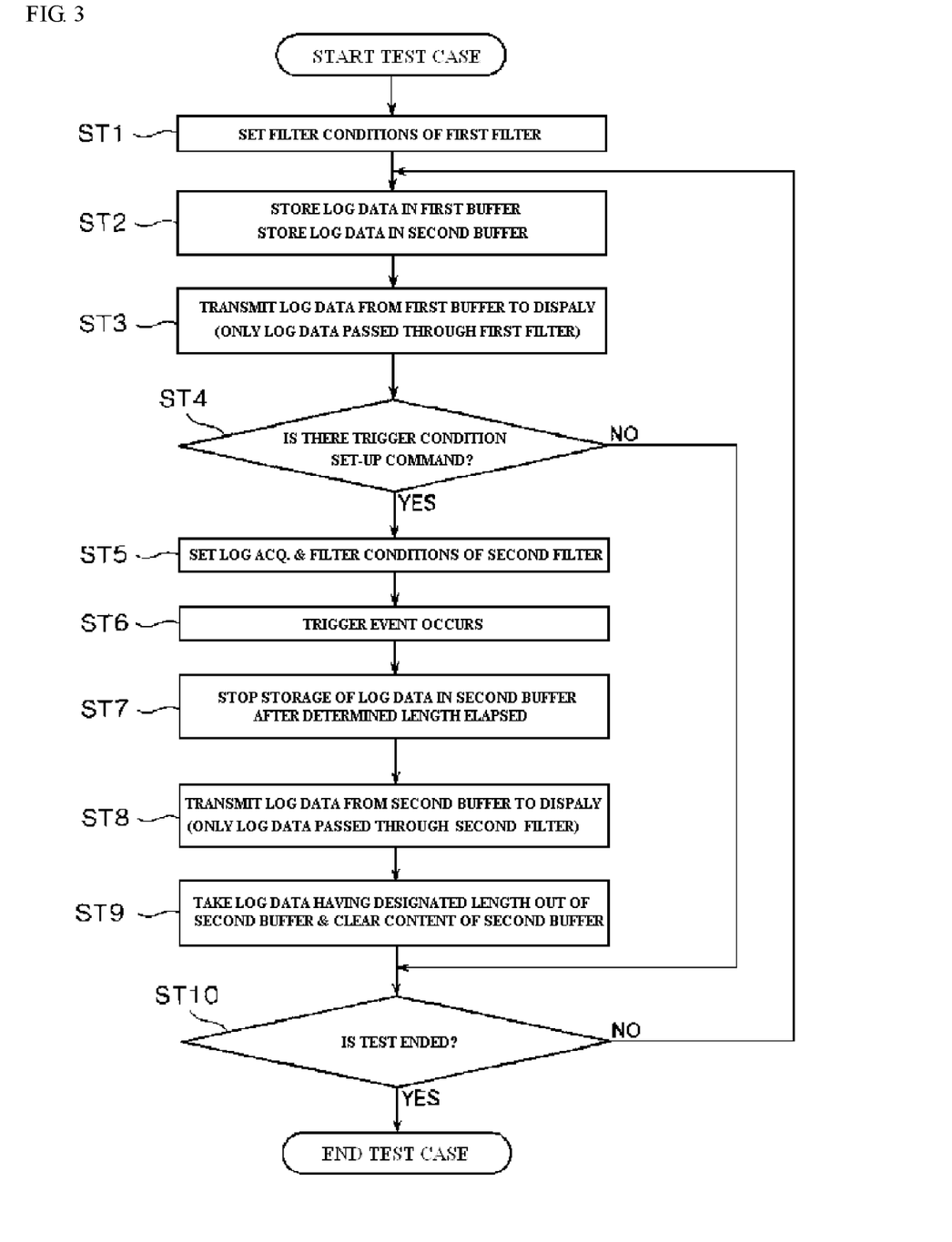
FIG. 3 is a flowchart showing a log data acquisition process of a pseudo base station apparatus in accordance with an exemplary embodiment of the present invention.
Figures 4, 4A:
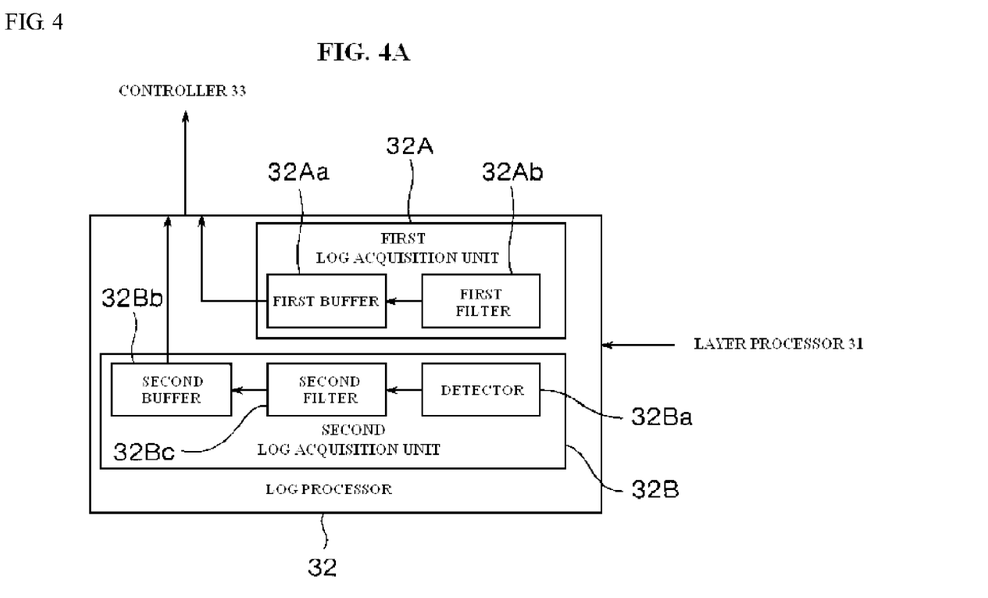
FIGS. 4A and 4B are diagrams showing log acquisition units having different configurations.
Figure 4B:
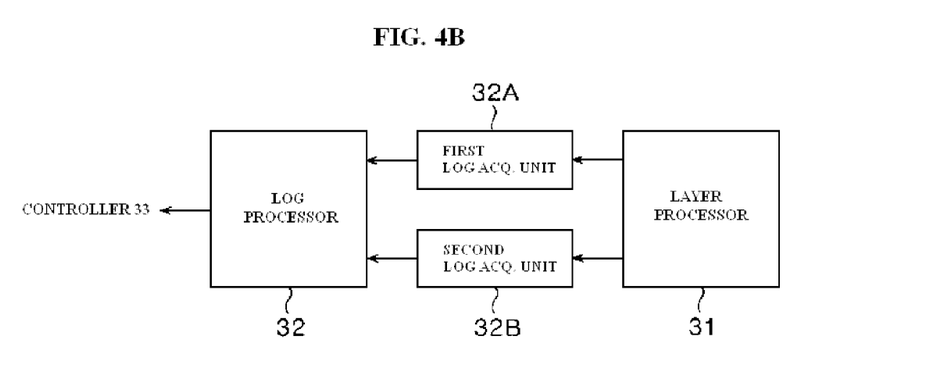

FIG. 1 is a block diagram showing a schematic configuration of a pseudo base station apparatus in accordance with an exemplary embodiment of the present invention, FIGS. 2A to 2E are diagrams showing examples of a process of acquiring log data based on log data acquisition conditions, FIG. 3 is a flowchart showing a process of acquiring log data of a pseudo base station apparatus in accordance with an exemplary embodiment of the present invention, and FIGS. 4A and 4B are diagrams showing log acquisition units having different configurations.

As shown in FIG. 1, the pseudo base station apparatus 1 broadly comprises a pseudo base station 3, which is wired or wirelessly connected to a mobile terminal 2 as a terminal to be tested, and a control terminal 4 which outputs a variety of commands to the pseudo base station 3 according to a scenario written in advance to transmit and receive desired communication information between the mobile terminal 2 and the pseudo base station 3, acquires log data based on the transmission and reception of the communication information between the mobile terminal 2 and the pseudo base station 3, and displays the acquired log data.

Meanwhile, the scenarios used in this embodiment are related to the operations for simulating a communication sequence performed by the pseudo base station 3 which imitates the actual base station. A plurality of scenarios, in which the operation of each process is described, such as a scenario related to a process of a first log acquisition unit 32A in which filter conditions are reflected, a scenario related to a process of a second log acquisition unit 32B in which filter conditions and log data acquisition conditions are reflected, a scenario related to a transmission process of log data stored in a log processor 32, and a scenario related to a display process of the log data, are stored in a scenario storage unit 42, which will be described later.

The pseudo base station 3 transmits and receives desired communication information to and from the mobile terminal 2 in response to a command from the control terminal 4 according to a predetermined scenario, stores the log data based on the transmission and reception of the communication information, and transmits the log data to the control terminal 4. As shown in FIG. 1, the pseudo base station 3 includes a layer processor 31, a log processor 32, and a controller 33.

The layer processor 31 performs each process according to a predetermined scenario in each of a plurality of layers such as a physical (PHY) layer, a radio link control (RLC) layer, a media access control (MAC) layer, and a terminal equipment (TE) layer.

In this embodiment, as shown in FIG. 1, the layer processor 31 comprises a PHY DSP 31a, a RLC/MAC DSP 31b, and a TE DSP 31c, each having a microprocessor specialized in audio or video processing. The layer processor 31 outputs log data for each layer by the PHY DSP 31a, the RLC/MAC DSP 31b, and the TE DSP 31c to the log processor 32.

Like the layer processor 31, the log processor 32 comprises a LOG DSP having a microprocessor specialized in audio or image processing and, as shown in FIG. 1, includes a first log acquisition unit 32A and a second log acquisition unit 32B.

The first log acquisition unit 32A comprises a first buffer 32Aa and a first filter 32Ab.

The first buffer 32Aa comprises a typical buffer having a predetermined capacity (e.g., 256 Mbyte), not a circular buffer. In more detail, the first buffer 32Aa stores the log data and does not update the stored content when its capacity is full until the capacity becomes empty and has the advantage in that it can store time-series log data. The first buffer 32Aa having this advantage sequentially stores the log data for each layer from the layer processor 31.

The first filter 32Ab passes only the log data that coincides with filter conditions set by a set-up unit 41 (i.e., a filter condition set-up unit 41a), which will be described later, of the control terminal 4 among the log data stored in the first buffer 32Aa. The log data passed through the first filter 32Ab is a first log data that a user wants and is transmitted to the control terminal 4 through the controller 33.

The second log acquisition unit 32B comprises a detector 32Ba, a second buffer 32Bb, and a second filter 32Bc.

The detector 32Ba detects log data that coincides with log acquisition conditions set by the set-up unit 41 (i.e., a log acquisition condition set-up unit 41b), which will be described later, of the control terminal 4 among the log data for each layer from the layer processor 31 and outputs the detected log data to the second buffer 32Bb.

The second buffer 32Bb comprises a circular buffer having a predetermined capacity (e.g., 256 Mbyte). In more detail, the second buffer 32Bb is to store the log data and frequently update the stored content when the capacity is full and has the advantage in that it can store up-to-date log data at all times. The second buffer 32Bb having this advantage frequently updates the log data detected by the detector 32Ba and stores the updated log data.

The second filter 32Bc passes only the log data that coincides with filter conditions set by the set-up unit 41 (i.e., the filter condition set-up unit 41a), which will be described later, of the control terminal 4 among the log data stored in the second buffer 32Bb. The log data passed through the second filter 32Bc is a second log data that the user wants and is transmitted to the control terminal 4 through the controller 33.

That is, the log processor 32 transmits the first log data acquired by the first log acquisition unit 32A to the control terminal 4 and, when the log data that coincides with the log acquisition conditions is generated, transmits the second log data acquired by the second log acquisition unit 32B to the control terminal 4.

The controller 33 comprising a CPU generally controls the respective units with respect to the transmission and reception of communication information to and from the mobile terminal 2 and with respect to a series of processes of the log data so as to control the communication with the mobile terminal 2, the acquisition of the log data from the layer processor 31, the storage of the log data from the layer processor 31 to the log processor 32, and the acquisition and display of the log data stored in the log processor 32 in response to commands from the control terminal 4 according to the predetermined scenarios.

Next, the control terminal 4 outputs a command according to the processed content to the pseudo base station 3 such that the transmission and reception of desired communication information can be performed between the pseudo base station 3 and the mobile terminal 2 according to a scenario for each process stored in the scenario storage unit 42, thus testing whether the mobile terminal 2 normally operates.

The control terminal 4, as shown in FIG. 1, includes the set-up unit 41, the scenario storage unit 42, and a display 43.

The set-up unit 41 performs a variety of set-up operations to perform the transmission and reception of desired communication information according to a predetermined scenario between the mobile terminal 2 and the pseudo base station 3, store a desired log data from the log data by the transmission and reception of the communication information, and display the stored log data on the display 43. The set-up unit 41 includes the filter condition set-up unit 41a and the log acquisition condition set-up unit 41b.

The filter condition set-up unit 41a sets the filter conditions of the log data passed through the first filter 32Ab among the log data stored in the first buffer 32Aa. This set-up is reflected in the scenario related to the process of the first log acquisition unit 32A and stored in the scenario storage unit 42. Moreover, the filter condition set-up unit 41a sets the filter conditions of the log data passed through the second filter 32Bc among the log data stored in the second buffer 32Bb. This set-up is reflected in the scenario related to the process of the second log acquisition unit 32B and stored in the scenario storage unit 42.

The log acquisition condition set-up unit 41b sets the log acquisition conditions (i.e., trigger generating conditions) which allow the detector 32Ba to detect the log data that the user wants among the log data for each layer from the layer processor 31. The log acquisition conditions (i.e., trigger generating conditions) are message data of the flowing items (1) to (6) reflected in the scenario related to the process of the second log acquisition unit 32B and stored in the scenario storage unit 42 by the input from the set-up unit 41 by the user's selection.

(1) Capture Length: To determine a time (msec) for storing the log data from a trigger having a trigger delay;

(2) Trigger Delay Y: To determine a delay value (msec) from a trigger;

(3) Num of Event: To determine an AND/OR condition of an event, determine the number of occurrence under the OR condition, and acquire log data with the event under the determined condition and number of times;

(4) Trigger_ID[4]: To determine a parameter of an event with respect to the trigger, Control Par: To determine a parameter of a control, Message Par: To determine a message, and Number Threshold: To determine a threshold value of the number of Control Par/Message Par;

(5) Rate: To determine a transmission/reception throughput; and (6) Power: To determine a transmission/reception power.

FIGS. 2A to 2E shows the concrete examples of the above-described log data acquisition conditions.

FIG. 2A shows an example in which the log acquisition conditions are set such that the log data is acquired for 3 seconds after 1 second when a log acquisition function is performed and then all channels are displayed on a trace screen of the display 43.

FIG. 2B shows an example in which the log acquisition conditions are set such that the log data is acquired for 3 seconds after a log acquisition function is performed and then all channels are displayed on the trace screen of the display 43.

FIG. 2C shows an example in which the log acquisition conditions are set such that the log data is acquired for 3 seconds before 1 second when a fifth PHY_CRCERR_IND (U_E_DCH) is input and then only E_DCH is displayed on the trace screen of the display 43.

FIG. 2D shows an example in which the log acquisition conditions are set such that the log data is acquired for 3 seconds before 1 second when events of Trigger_ID[0]-Trigger_ID[1]-Trigger_ID[2]-Trigger_ID[3] are sequentially input and then only E_DCH is displayed on the trace screen of the display 43.

FIG. 2E shows an example in which the log acquisition conditions are set such that the log data is acquired for 3 seconds before 1 second when a seventh event is input and then only E_DCH is displayed on the trace screen of the display 43.

The scenario storage unit 42 is to store the scenarios related to the operations for simulating the communication sequence performed by the pseudo base station 3 which imitates the actual base station. That is, the scenario storage unit 42 stores the scenarios for a variety of processes such as the storage of the log data based on the filter conditions or the log acquisition conditions set by the set-up unit 41, the transmission of the stored log data, and the display of the log data.

The display 43 comprising a liquid crystal display device, for example, displays the log data (i.e., the first log data and second log data) transmitted from the log processor 32 of the pseudo base station 3 and performs a variety of displays related to the test of the mobile terminal 2 such as the display of a set-up screen when the filter conditions of the log acquisition conditions are set by the set-up unit 41. Meanwhile, the first and second log data transmitted from the log processor 32 of the pseudo base station 3 may be simultaneously or selectively displayed according to the set-up from the set-up unit 41.

Next, the operation related to the log data process performed by the pseudo base station apparatus 1 with the above-described configuration will be described with reference to the flowchart of FIG. 3.

Upon the start of a test case, if a test start command is input from the control terminal 4 according to the scenario stored in the scenario storage unit 42, the controller 33 of the pseudo base station 3 transmits and receive the communication information to and from the mobile terminal 2. And, the layer processor 31 generates and outputs the log data for each layer by the transmission and reception of the communication information.

Then, if the filter conditions of the first filter 32Ab are set by the filter condition set-up unit 41a of the control terminal 4 (ST1), the controller 33 of the pseudo base station 3 stores the log data for each layer from the layer processor 41 in the first buffer 32Aa (ST2). At this time, the log data for each layer from the layer processor 31 passes through the detector 32Ba as it is and is also stored in the second buffer 34Bb (ST2).

The controller 33 of the pseudo base station 3 transmits only the log data (i.e., the first log data that the user wants) passed through the first filter 32Ab from the first buffer 32Aa to the control terminal 4 (ST3). Therefore, the control terminal 4 displays the transmitted log data on the display 43.

Here, the controller 33 of the pseudo base station 3 determines whether a trigger condition set-up command is input from the control terminal 4 (ST4). If it is determined that the trigger condition set-up command is input from the control terminal 4, the log acquisition conditions (i.e., trigger generating conditions) of the second filter 32Bc are set by the log acquisition condition set-up unit 41b of the control terminal 4 and, at the same time, the filter conditions of the second filter 32Bc are set by the filter condition set-up unit 41a of the control terminal 4 (ST5). Otherwise, if it is determined that no trigger condition set-up command is input from the control terminal 4, it is determined whether the test is ended (ST10).

If a trigger event occurs during the execution of the scenario (ST6), the controller 33 of the pseudo base station 3 stops the storage of the log data in the second buffer 32Bb after a Length determined by the scenario elapses (ST7). And, the controller 33 of the pseudo base station 3 transmits only the log data (the second log data that the user wants) passed through the second filter 32Bc from the second buffer 32Bb to the control terminal 4. Therefore, the control terminal 4 displays the transmitted log data on the display 43 (ST8). Otherwise, if it is determined that no acquisition (display) command is input from the control terminal 4, it is determined whether the test is ended (ST10).

Afterward, the controller 33 of the pseudo base station 3 takes the log data having a Length determined by the scenario out of the second buffer 32Bb and clears the stored content of the second buffer 32Bb (ST9). Then, it is determined whether the test is ended (ST10) and, if it is determined that the test is ended, the test case is ended. Otherwise, if it is determined that the test is not ended, the process is returned to ST2.

Meanwhile, although each of the first and second log acquisition units 32A and 32B of the pseudo base station apparatus 1 as shown in FIG. 1 has the configuration in which the filter is connected to the rear of the buffer, the present invention is not limited to this configuration. For example, as shown in FIGS. 4A and 4B, the connection configuration of the buffer and the filter together the filter conditions and the log acquisition conditions set by the set-up unit 41 may be appropriately modified according to the log data that the user wants.

In the connection configuration shown in FIG. 4A, the first filter 32Ab of the first log acquisition unit 32A is connected to the front of the first buffer 32Aa, and the second filter 32Bc of the second log acquisition unit 32B is connected to the front of the second buffer 32Bb. Meanwhile, in the second log acquisition unit 32B, the second filter 32Bc may be connected to the front of the detector 32Ba.

In the connection configuration shown in FIG. 4B, the first log acquisition unit 32A and the second log acquisition unit 32B are connected between the layer processor 31 and the log processor 32. Meanwhile, it is considered that the buffers 32Aa and 32Bb of the first and second log acquisition units 32A and 32B may be connected in a manner as shown in FIG. 1 or 4A and the second filter 32Bc may be connected to the front of the detector 32Ba.

As such, in the pseudo base station apparatus 1 according to this embodiment of the present invention, when the filter conditions set by the control terminal 4 are transmitted to the log processor 32 through the controller 33, the log data for each layer from the layer processor 31 is stored in the first buffer 32Aa, the log data stored in the first buffer 32Aa is filtered by the first filter 32Ab based on the filter conditions, and only the filtered log data as the first log data that the user wants is transmitted to the control terminal 4 through the controller 33 to be displayed on the display 43.

Moreover, when the filter conditions and the log acquisition conditions (i.e., trigger conditions) set by the control terminal 4 are transmitted to the log processor 32 through the controller 33, the detector 32Ba determines whether the log data for each layer from the layer processor 31 coincides with the log acquisition conditions.

If the log data that coincides with the log acquisition conditions is detected, the detector 32Ba stores the detected log data in the second buffer 32Bb. Subsequently, the log data stored in the second buffer 32Bb is filtered by the second filter 32Bc based on the filter conditions, and only the filtered log data as the second log data that the user wants is transmitted to the control terminal 4 through the controller 33 to be displayed on the display 43.

That is, in the pseudo base station apparatus 1 according to the present invention, two log acquisition units 32A and 32B are provided such that the control data between the mobile terminal 2 and the pseudo base station 3 is acquired by the log acquisition unit at one side and a large amount of data including the user data to which the user pays attention is acquired by the log acquisition unit at the other side, thus certainly acquiring the log data that the user wants to acquire without omission. As a result, it is possible to efficiently perform the analysis using the acquired log data.

Moreover, if the first filter 32Ab is connected to the front of the first buffer 32Aa and, at the same time, the second filter 32Bc is connected to the front of the second buffer 32Bb, only the necessary data is stored in the buffer. Therefore, if the filter conditions are set such that only the log data of C-Plane, for example, is stored in the buffer, it is possible to reduce the omitted log data.

Furthermore, since a predetermined amount of data (e.g., 256 Mbyte) is updated in real time by providing the second buffer 32Bb comprising a circular buffer in the log processor 32, it is possible to acquire the log data by the operation of the user at the user's desired timing.

However, in the pseudo base station apparatus 1 of FIG. 1, in the event of a delay in the user's operation, the desired log data may not be acquired only with the function of the second buffer 32Bb comprising the circular buffer.

For this reason, in the embodiment of the present invention, if the content of the log data from the layer processor 31 coincides with the log data acquisition conditions (e.g., PHY_CRCERR_IND) set by the user, it is used as a trigger point such that the log data before and after the trigger point is stored in the second buffer 32Bb and the stored log data is transmitted to the control terminal 4 to be acquired. Therefore, the log data to which the user pays attention can be acquired, thus facilitating the user's analysis.

Moreover, in the embodiment of the present invention, since two types of buffers such as the first buffer 32Aa, which does not update the stored content when its capacity is full until the capacity becomes empty so as to store time-series log data, and the second buffer 32Bb, which frequently updates the log data when the capacity is full so as to store up-to-date log data at all times are provided, it is possible to utilize the advantages of the different type of buffers. For example, only the log data of C-Plane is set in the first filter 32Ab as the filter conditions, and all of the log data is set in the second filter 32Bc. Therefore, the time-series log data of C-Plane is less omitted, and it is possible to acquire the entire log data only in a desired position.

However, although the pseudo base station apparatus 1 is configured by the control terminal 4, which includes an external terminal device, and the pseudo base station 3, which performs the transmission and reception of desired communication information according to the scenario in response to a command from the control terminal 4 in the above-described embodiment, the function of the control terminal 4 may be assigned to the pseudo base station 3 to have a stand alone configuration, since the data rate of between the log processor 32 and the controller 33 is smaller or equal to that between the controller 33 and the control terminal 4. In this case, the pseudo base station 3 of FIG. 1 further includes the functions of the set-up unit 41, the scenario storage unit 42, and the display 43 and executes the scenarios stored in the scenario storage unit 42 based on the content of the set-up unit 41 to perform a variety of tests on the mobile terminal 2, acquire the desired log data (i.e., the first log data and second log data) according to the variety of tests, and display the log data on the display 43.

As described above, according to the present invention, two log acquisition units are provided in the pseudo base station apparatus of the present invention such that the control data between the terminal to be test and the pseudo base station is acquired by the log acquisition at one side and a large amount of data including the user data to which the user pays attention is acquired by the log acquisition unit at the other side, thus certainly acquiring the log data that the user wants to acquire without omission. As a result, it is possible to efficiently perform the analysis using the acquired log data.

Moreover, with the configuration in which the first filter is connected to the front of the first buffer and, at the same time, the second filter is connected to the front of the second buffer, only the necessary data is stored in the buffer. Therefore, if the filter conditions are set such that only the log data of C-Plane, for example, is stored in the buffer, it is possible to reduce the omitted log data.

Furthermore, since a predetermined amount of data is updated in real time by providing the second buffer comprising a circular buffer in the log processor, it is possible to acquire the log data by the operation of the user at the user's desired timing.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A pseudo base station apparatus, which transmits and receives a variety of communication information to and from a mobile terminal to be tested according to a predetermined scenario and sends desired log data based on the transmission and reception to a display, the apparatus comprising:
   a set-up unit for setting log acquisition conditions;
   a first log acquisition unit including a first buffer, which stores log data and updates the stored log data when the buffer capacity is full, and acquiring a desired first log data; and
   a second log acquisition unit including a detector, which detects log data that coincides with the log acquisition conditions among the log data, and a second buffer, which stores the detected log data and whenever the detector detects the log data and updates the stored log data within the range of the buffer capacity, and acquiring a desired second log data;
   wherein the apparatus acquires the first log data by the first log acquisition unit and, when the log data that coincides with the log acquisition conditions is generated, sends the second log data acquired by the second log acquisition unit data to the display to be displayed.

2. The apparatus of claim 1, further comprising two filters, each of the filters being connected to the first and second buffers respectively, wherein the set-up unit sets the filter conditions for the two filters to pass the log data in addition to the log acquisition conditions.

3. The apparatus of claim 1, further comprising at least one filter, the filter being connected to a front of at least one of the first and second butters, wherein the set-up unit sets the filter conditions for the filters to pass the log data in addition to the log acquisition conditions.

4. A test method for mobile terminals, in which a variety of communication information is transmitted and received to and from a mobile terminal to be tested according to a predetermined scenario, and desired log data is sent based on the transmission and reception to a display, the method comprising:
   a setting-up step for setting log acquisition conditions;
   a first log data storing step for storing said log data on a first buffer as a first log data;
   a first log data outputting step for outputting the first log data stored on the first buffer completely when the first buffer capacity is full, and emptying the first buffer;
   a first updating step for repeating said first log data storing step and the first log data outputting step;
   a second updating step for updating said log data constantly and storing the log data on a second buffer;
   a detecting step for detecting log data that coincides with a log acquisition condition among the log data;
   a second log data displaying step for storing the first log data at the first log data storing step, and, when a log data that coincides with the log acquisition conditions is detected at the detecting step, and outputting the log data stored on the second buffer as a second log data to be displayed.

5. The method of claim 4, wherein the setting-up step is for setting filter conditions for passing the log data in addition to said log acquisition conditions, and further comprising;
   a first filtering step for passing a log data that satisfies said filter conditions among the first log data outputted from the first buffer, and
   a second filtering step for passing a log data that satisfies said filter conditions among the second log data outputted from the second buffer.

6. The method of claim 4, wherein the setting-up step is for setting filter conditions for passing the log data in addition to said log acquisition conditions, and further comprising least one of;
   a first filtering step for passing a log data that satisfies said filter conditions among the log data and outputting the log data to said first buffer, or
   a second filtering step for passing a log data that satisfies said filter conditions among the log data and outputting the log data to said second buffer.

* * * * *

UNITED STATES PATENT AND TRADEMARK OFFICE
CERTIFICATE OF CORRECTION

PATENT NO. : 8,073,011 B2  
APPLICATION NO. : 12/723904  
DATED : December 6, 2011  
INVENTOR(S) : Watanabe et al.

Page 1 of 1

It is certified that error appears in the above-identified patent and that said Letters Patent is hereby corrected as shown below:

In the Claims

Col. 10, line 44  Delete "butters" and insert --buffers-- in its place.  
Claim 3

Col. 12, line 3  Delete "comprising least" and insert --comprising at least--  
Claim 6  in its place.

Signed and Sealed this  
Twelfth Day of June, 2012

David J. Kappos  
*Director of the United States Patent and Trademark Office*